United States Patent [19]
Morishige

[11] 3,834,645
[45] Sept. 10, 1974

[54] CORD WINDING DEVICE

[75] Inventor: Toshinori Morishige, Tokyo, Japan

[73] Assignee: Starting Industry Company Limited, Tokyo, Japan

[22] Filed: Aug. 22, 1972

[21] Appl. No.: 282,664

[30] Foreign Application Priority Data
Feb. 5, 1972  Japan.......................... 47-15297[U]
May 8, 1972  Japan.......................... 47-53401[U]

[52] U.S. Cl............................. 242/107.7, 188/82.7
[51] Int. Cl........................................... B65h 75/48
[58] Field of Search......... 242/107.7, 107.6, 107.12, 242/107.3, 107.4, 107 R; 188/82.7

[56] References Cited
UNITED STATES PATENTS
1,737,323  11/1929  Mursu............................. 242/107.7
2,563,714  8/1951  Foster............................. 242/107.7
3,318,550  5/1967  Quenot............................ 242/107.3

Primary Examiner—John W. Huckert
Assistant Examiner—Jon W. Henry
Attorney, Agent, or Firm—William J. Daniel

[57] ABSTRACT

This invention relates to a cord winding device including an enclosed reel for receiving a length of cord, a spring for re-winding the reel, and a rotatable latch cooperating with the ratchet and operable to alternately release the ratchet to permit free rotation of the reel and then latch the ratchet in position restraining the reel against re-winding. A brake for controlling the rotation speed of the reel can be provided.

7 Claims, 7 Drawing Figures

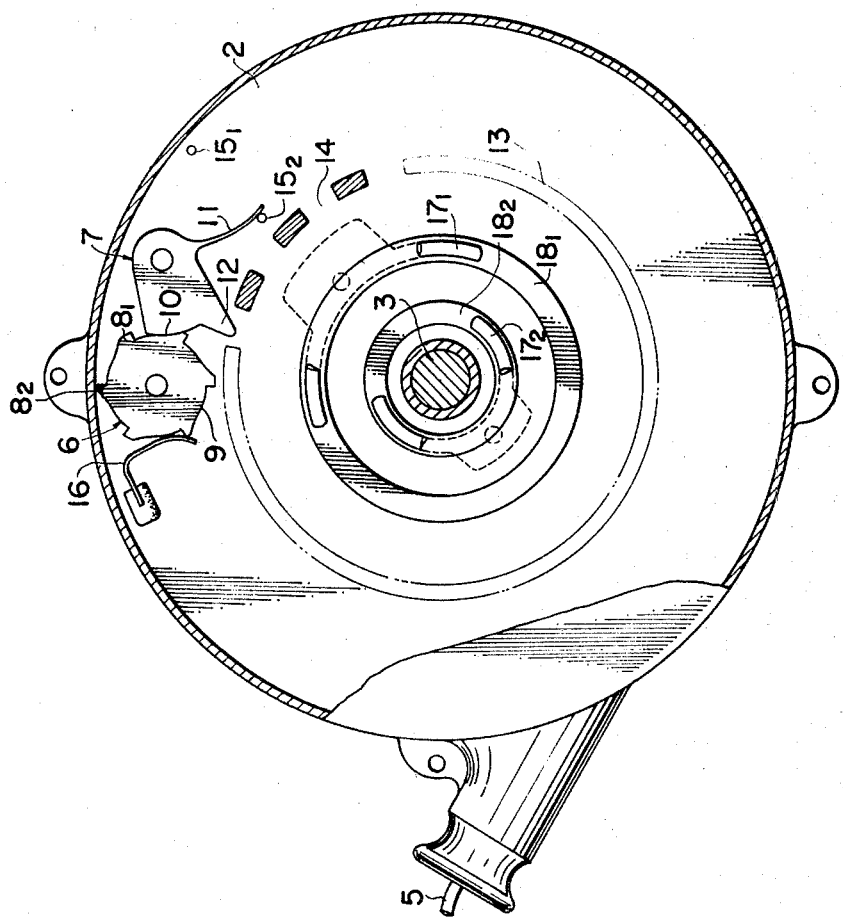
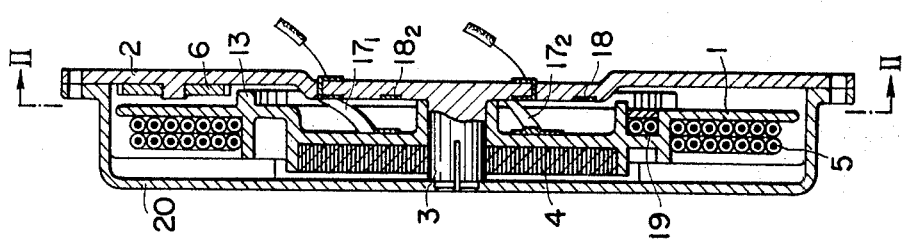

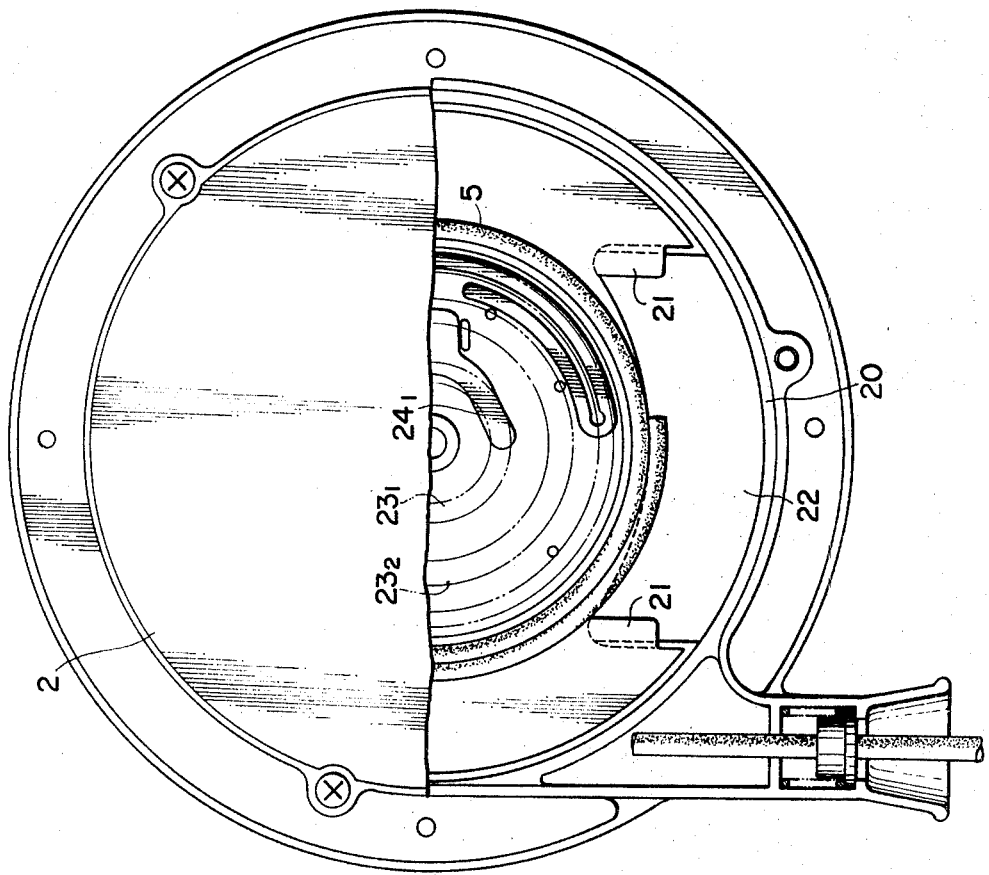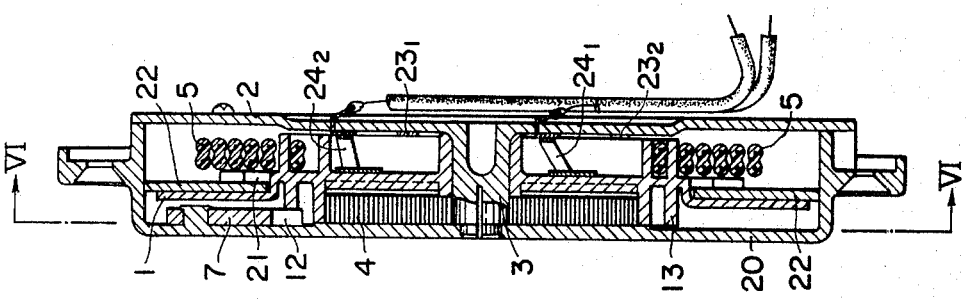

CORD WINDING DEVICE

This invention relates to cord winding devices for domestic electrical appliances or the like and more particularly to a mechanism for preventing the break of a cord when it is wound up.

One conventional cord winding device is so designed that, when a push button fitted to it is pushed, a clutch will be disengaged and the cord will be wound up into it by the force of a spring. Thus, it is necessary in using this device first to disconnect the cord from the current source, i.e., wall receptacle, and then to push an activate button at a location remote from the wall receptacle, which is inconvenient.

Further, in cord winding devices wherein the cord is wound up by utilizing the returning force of a spring, it has often been a problem that the cord is wound up by the returning force of the spring with such force that the cord, will eventually be broken by such repeated impact of the terminal plug against a stop or receiver.

One method of preventing such breaking of the cord, depends upon using a spring to cushion the impact of the plug, but the result is not ideal. It is also known to stop the plug before it collides with the plug receiving part but the structure to do this is complicated and costly.

A main object of the present invention is to provide a cord winding device whereby the re-winding of the cord can be easily initiated by a slight forward pull of the cord by hand without the necessity for pushing any push button.

Another object of the present invention is to provide a mechanism for reducing the likelihood of the cord being broken by impact at high speeds of the plug against a stop.

In the drawings:

FIG. 1 is a vertical cross-section through one embodiment of the cord winding device according to the present invention;

FIG. 2 is a horizontal section taken on line II — II in FIG. 1;

FIG. 4 is a section view similar to FIG. 1 of a modified embodiment of cord winding device according to the present invention including a brake for limiting the rotational speed of the reel;

FIG. 5 is a back view of the device of FIG. 4 shown partly in section;

Figure 3A:
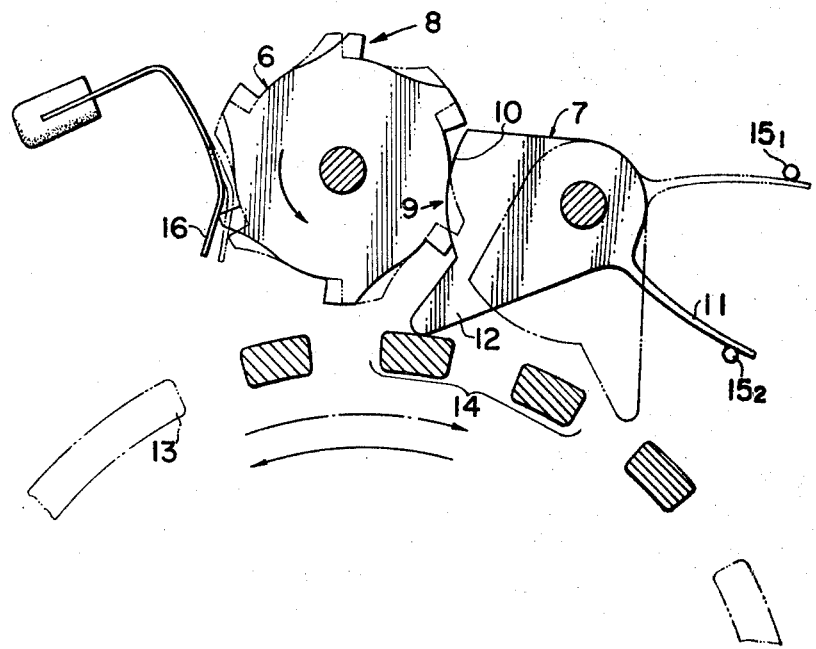
FIG. 3A is a detail view showing the condition of the latching cam and rachet while a cord is rewound (solid lines) or extended (dashed lines)

In FIGS. 1 and 2, the numeral 1 designates a reel borne on a shaft 3 attached to a back plate 2 and having a force applied by a spring 4 in a direction (the counterclockwise rotating direction in FIG. 2) for rewinding thereon a cord 5 by a spring 4.

A latching cam 6 and ratchet pawl 7 are mounted on the back plate 2 for rotational and pivotal movement respectively. The ratchet pawl 7 is a generally sector shaped, with an arcuate surface or edge 10 formed at one end. A spring like extension 11 is provided at the other end to resiliently limit the extent of movement in either direction. Further, a projection 12 is provided at one side of the arcuate edge 10 and engages with one of grooves 14 provided at regular intervals in an annular flange 13 provided on the reel 1 to serve as a ratchet gear cooperating with ratchet pawl 7. The ratchet 7 may be swung to the left and right respectively with the normal and reverse rotations of the reel and stoppers $15_1$ and $15_2$ are provided at a spacing from each other so that, when the projection 12 of the ratchet pawl 7 is rotated to either of its extreme positions indicated in FIG. 3A, the spring extension 11 applies a spring pressure to the ratchet pawl 7 to rotate it in the reverse direction.

The latching cam 6 functions to alternately release pawl 7 for free pivotal movement in a clockwise direction (within the limits imposed by spring extension 11 and stops 15 and $15_2$) and latch pawl 7 in an operative projecting position engaging one of the lands or teeth of the interrupted flange 13 and preventing further counterclockwise movement of flange 13 and thus of reel 1 to rewind the cord. To this end, the cam 6 is formed with alternating detent regions and clearance regions and is arranged to be advanced in sequence between such regions one by one.

Specifically, latching cam 6 is provided around its periphery with spaced apart teeth 8 which serve to advance the cam stepwise by engagement with the shoulder at the end of arcuate surface 10 of pawl 7 each time pawl 7 swings clockwise under the impetus of the rewinding motion of reel 1. Between each pair of teeth 8 is a curved edge 9 which is shaped to allow the curved pawl edge 10 to clear the same and is preferably curved to mate smoothly with curved pawl edge 10. For alternate ones $8_2$ of the teeth 8, the corresponding curved edge $9_2$ is disposed directly following the tooth shoulder so that, as can be seen in FIG. 3B, the shoulder of a tooth $8_2$ engages the leading shoulder of pawl 7 when the curved pawl edge moves past the curved cam edge $9_2$. On the other hand, for the intervening teeth $8_1$, the corresponding curved edge is spaced clear of the tooth shoulder a sufficient distance that the pawl shoulder can swing clear of the tooth (as shown in solid lines in FIG. 3A) and allow the pawl projection 12 to move out of the path of the interrupted flange 13, permitting reel 2 to rewind.

Figure 3B:
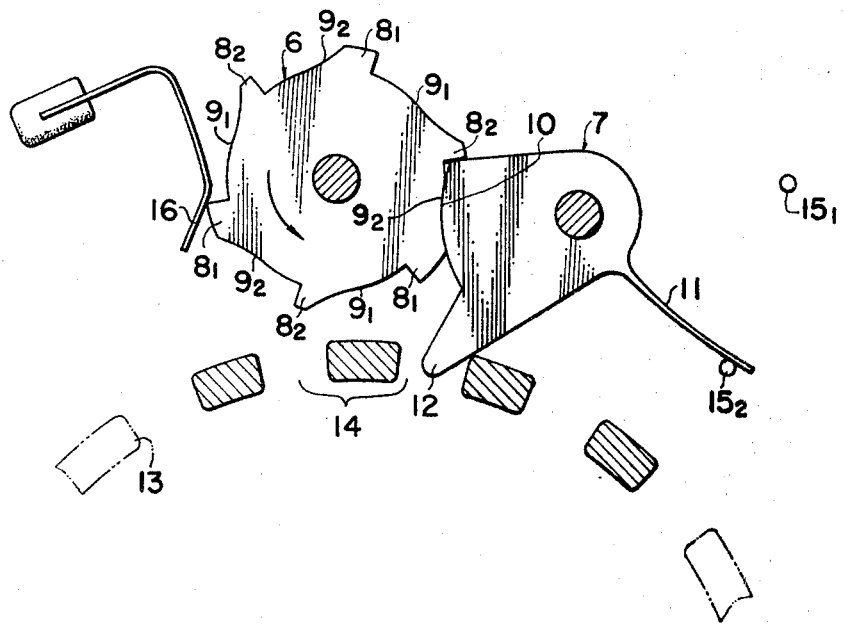
FIG. 3B is a detail view showing the condition of the latching cam and rachet when the reel is temporarily locked against rewinding.

In the embodiment of FIGS. 3A and 3B, the spacing of the curved cam edges 9 relative to the teeth 8 is determined by the radical extent or width of the teeth, the teeth $8_1$ being expanded to position each cam edge $9_2$ directly proximate to a tooth $8_3$.

A cam spring 16 is provided in contact with the outer periphery of the cam 7 so as: first, to advance the cam whenever the pawl is swung counterclockwise as the cord is extended from the reel to project the next of the teeth 8 into the path of the pawl leading shoulder (i.e., from the solid to the dashed line positions in FIG. 3A), and, second, to advance the cam as necessary to bring the curved edges 9 and 10 into contact.

Flexible contacts $17_1$ and $17_2$ are fitted on the inner face of the reel 1 so as to slide respectively on annular terminals $18_1$ and $18_2$ arranged on the back plate 2 and are connected with a motor in the appliance with which the device of the invention is associated. The cord 5 is fixed at one end as at 19 to the reel 1 and is connected with the contact springs $17_1$ and $17_2$. 20 is a housing for the reel. The operation of the thus formed cord winding device shall be explained in the following with reference to FIGS. 3A and 3B.

First of all, in FIG. 3A, when the cord 5 is extended, the reel 1 and interrupted flange 13 will rotate clockwise (in the direction indicated by the arrow shown by the broken line). Then the projection 12 of ratchet pawl 7 will be swung to the right side shown by the broken line. In this position, the projection 12 will be biased in a clockwise direction by the spring 11. When the cord 5 is released in a proper position, the reel 1 will be rotated in the rewinding direction by the spring 4. Therefore, the interrupted flange 13 will rotate counterclockwise (in the direction indicated by the solid line arrow) and the projection 12 will be engaged with one of the grooves 14 by the spring pressure of the spring 11 as shown in solid lines in FIG. 3B. At the same time, one of the cam teeth, in this case a tooth 8B, will be pushed by the shoulder of arcuate 10 of the ratchet pawl 7 and the cam 6 will be advanced but will be stopped in the position shown in FIG. 3B when the arcuate edge 10 of the ratchet pawl 7 fits into the small concave edge 9 directly following the tooth $8_2$.

Next when the cord is to be rewound on reel 2, by slightly pulling the cord forwardly, the projection 12 of the ratchet pawl 7 will be rotated counterclockwise and the ratchet pawl 7 will be disengaged with the cam 6 in the dashed line position of FIG. 3A. The cam is then free to be rotated by the action of spring 16 in a counterclockwise direction a sufficient arc to advance the next tooth $8_1$ into the path of pawl 7. When the cord is released after the slight forward motion, the ratchet pawl 7 will rotate clockwise as reel 2 starts to rewind and the cam 6 will be rotated counterclockwise by the engagement of the pawl 7 with the next tooth $8_1$ on cam 6 until the pawl 7 engages its convex edge 10 with the concave edge $9_1$ of the cam 6. Therefore the ratchet pawl 7 will be able to rotate freely past the tooth $8_1$ to the position seen in the solid lines in FIG. 3A. Thus, the reel 2 can rotate freely in the cord winding direction (indicated by the solid line arrow) and thus all the cord can be rewound.

Figure 6:
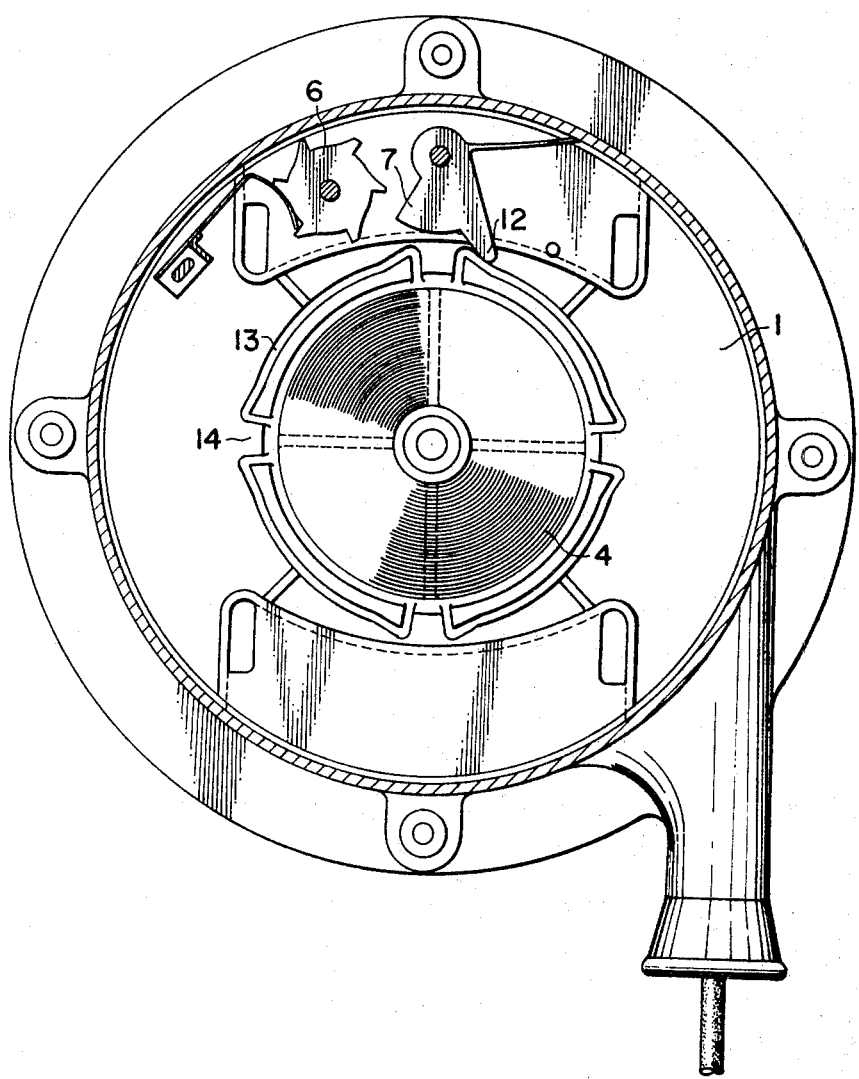
FIG. 6 is a horizontal section taken on line VI — VI of FIG. 4.

The mechanism for preventing rupture of the cord in the cord winding device according to the present invention shall be explained with reference to a modified embodiment seen in FIGS. 4–6. Here, the outer margin of reel 2 is stepped, preferably at diametrically opposite points, as at 21, to define a flat pocket-like recess for slidably receiving a solid metal slug 22 which functions as a brake shoe.

The cord 5 is connected at one end with brushes $24_1$ and $24_2$ so as to slide on contact rings $23_1$ and $23_2$ fitted to the inside surface of the back plate 2. The ratchet pawl 7 and latching cam 6 are in this case relocated to the inside of the housing 20 but are otherwise the same as in the previous embodiment.

In operation, when the cord 5 is wound up by the reel 1 after use, the centrifugal force caused by the rotation of the reel 1 will urge the brake shoes 22 into contact with the inside surface of the housing 20 so that a frictional force acts to limit the velocity of rotation of reel 1 and thus of retraction of cord 5. When the rotating velocity reduces, the centrifugal force will weaken and the frictional force will reduce. Thus the cord 5 can be wound up on the reel 1 at a substantially constant velocity.

What is claimed is:

1. In a cord winding device comprising a reel for receiving a length of cord arranged for rotation about an axis, spring means yieldable to permit rotation of said reel in one direction for unwinding the cord therefrom and biasing said reel in the opposite direction to rewind such cord, a circular array of ratchet teeth integral with said reel and a double swinging pawl pivoted adjacent said array of ratchet teeth for swinging movement in two directions between two extreme pivotal disengaging positions out of engagement with the ratchet to allow free movement of said ratchet array and hence said reel and including an intermediate ratchet engaging position to hold the ratchet against rotation, in combination, an improved pawl latching arrangemnt comprising a rotary latching cam wheel mounted for rotational movement adjacent the path of said pawl, said cam wheel having around its periphery alternating detent and clearance surfaces, each such detent surface when engaged by said pawl restraining said pawl against movement in said one direction out of its ratchet engaging position to prevent rotation of said reel in one direction and each such clearance surface when engaged by said pawl permitting said pawl to swing to one ratchet disengaging position to permit rotation of said reel in said one direction, and means operated in response to successive disengagements of said pawl with said cam wheel to rotate said cam wheel stepwise to advance said detent and clearance surfaces in turn, whereby said reel is alternately latched against rotation in one direction and released upon sequentially changing the direction of reel rotation.

2. The device of claim 1 wherein said stepwise cam wheel rotating means comprises circumferentially spaced teeth on said cam wheel, a tooth-engaging shoulder on said pawl, and spring means for advancing said wheel a sufficient distance to present the next successive tooth into the path of said pawl shoulder.

3. The device of claim 2 wherein circumferentially spaced teeth on said cam wheel also comprise said detent surfaces.

4. The device of claim 2 wherein said pawl includes a segment having a generally arcuate peripheral surface, said cam wheel is of generally circular configuration exclusive of said teeth with such a radius terminating in closely spaced relation to the path of said pawl arcuate surface, and said teeth are arranged on said wheel in alternating pairs, one such pair being spaced sufficiently close radially to jam against said arcuate surface and obstruct further pivotal movement of said pawl, and the other such pair being spaced apart a sufficient distance to permit said arcuate surface to pass therebetween.

5. The device of claim 1 including spring means operative when said pawl is in either of its ratchet disengaging positions to bias the pawl in the opposite direction into the path of said ratchet teeth.

6. The device of claim 2 including braking means for limiting the rewinding velocity of said reel.

7. The device of claim 6 wherein said braking means comprises at least one radially movable brake shoe carried on said reel and a cylindrical surface enclosing said reel for engagement by said shoes, each such shoe being movable under centrifugal force created by rotation of said reel.

* * * * *

UNITED STATES PATENT OFFICE
CERTIFICATE OF CORRECTION

Patent No. 3,834,645          Dated  September 10, 1974

Inventor(s) Toshinori MORISHIGE

It is certified that error appears in the above-identified patent and that said Letters Patent are hereby corrected as shown below:

Column 4, Claim 6, line 57, change "claim 2" to -- claim 1 --.

Signed and sealed this 5th day of November 1974.

(SEAL)
Attest:

McCOY M. GIBSON JR.
Attesting Officer

C. MARSHALL DANN
Commissioner of Patents